United States Patent Office 2,695,861
Patented Nov. 30, 1954

2,695,861

PREPARATION OF INSULIN

Loyal C. Maxwell, Chicago, and William P. Hinkel, Brookfield, Ill., assignors to Armour and Company, Chicago, Ill., a corporation of Illinois No Drawing. Application April 3, 1951,
Serial No. 219,125

The portion of the term of the patent subsequent to
May 6, 1969, has been disclaimed

4 Claims. (Cl. 167—75)

This invention relates to the preparation of insulin from pancreas glands. This application constitutes a continuation-in-part of our co-pending applications, Serial Nos. 103,956 filed July 9, 1949, now abandoned, and 158,928, now Patent 2,595,278.

In the commercial manufacture of insulin, the practice has been to extract the insulin from pancreas glands, using acidified alcoholic solutions employing hydrochloric acid or sulphuric acid. In such extraction steps, the pH of the extraction mixture is normally maintained at about 2.0. The pancreas glands are hashed and, in the usual commercial process, the insulin is extracted therefrom by using a solvent consisting of ethyl alcohol and hydrochloric acid, the alcohol being in a concentration of approximately 65% to 75% on the basis of the extraction volume after equilibrium is attained. After adjusting the pH to about 2.0, the mixture is agitated for several hours and centrifuged, the meat solids being reextracted under the same conditions. The centrifugate liquors from both steps are then made alkaline, using ammonia, and are filtered. The filtered extracts are concentrated and further purified for insulin recovery.

The foregoing process gives a yield which amounts to only a small percentage of the insulin we believed to be actually contained in the glands. Since the amount of insulin available to diabetic patients is critical, the matter of yield is one of great importance, and we set about to discover some method which will give greater yields of insulin in the extraction process and further yields of the final finished product in crystalline or amorphous condition for clinical administration. We have found that it is possible to employ phosphoric acid in the extraction step and obtain a substantially increased yield of insulin from pancreas glands.

We have further found that phosphoric acid, in the extracting solution, has the unique property of forming insoluble salts with bases, permitting the removal of the phosphoric acid as salt in the filtration operation, and thus greatly increasing the yield of insulin.

In addition to the use of sulphuric acid and hydrochloric acid as mentioned above, organic acids, such as acetic, formic and the like, may be employed. These organic acids have to be used in such quantities that their use is not considered practicable. Further, the presence of the large amount of soluble salts of these acids are undesirable in the subsequent steps of the process.

We have found that phosphoric acid, unlike sulphuric acid, hydrochloric acid and the above organic acids, has the unique property of forming insoluble salts, thus permitting the removal of the phosphoric acid from the process in an early filtration step following the extraction step.

An object of the invention is to provide a process in which phosphoric acid is employed in the extraction step and subsequently removed from the process as an insoluble salt. Another object is to provide a process in which phosphoric acid is employed in the extraction step and in which a base is added for the precipitation of the acid as an insoluble salt, the salt being removed along with precipitated protein material. A still further object is to provide a process in which phosphoric acid is effectively employed for the extraction of insulin, while at the same time removing the phosphoric acid as a salt to prevent insulin losses in subsequent necessary treating steps. Yet another object is to provide a process for the extraction of insulin in which phosphoric acid is present in the extraction step and eliminated as an insoluble salt prior to subsequent treating steps for the removal of lipoidal material, etc. Other specific objects and advantages will appear as the specification proceeds.

In applicants' process, pancreas glands from any source may be employed. For example, beef pancreas glands, pork pancreas glands and the pancreas glands from other animals and from fish, whale and other sources may be employed.

In one embodiment of our process, we extract the hashed pancreas glands in an organic solvent for insulin, such as ethyl alcohol, and in the presence of phosphoric acid. Preferably, sufficient phosphoric acid is employed to adjust the pH of the extraction mixture to about 3. The extraction mixture may then be filtered or centrifuged to remove the suspended solids. If desired, the solids or residue may be reextracted under substantially the same conditions and the filtrate combined with the first filtrate.

After the extraction step, we prefer to add a base, such as aqueous ammonia, to bring the pH to about 5.5–8.5, thereby forming an insoluble ammonium salt of the phosphoric acid, while at the same time precipitating inert protein material. The salt and the inert protein material may then be removed by filtration. Any suitable base for forming an insoluble salt with the phosphoric acid may be employed. For example, sodium hydroxide may be employed in lieu of ammonia. We prefer to employ a weak base, and aqueous ammonia is particularly effective in the operation.

The insulin in the alcoholic filtrates may be recovered by conventional procedures. The alkaline alcoholic filtrates are acidified and concentrated in vacuo at reduced temperatures and the insoluble lipoidal material removed by filtration. The insulin in the aqueous concentrate may be precipitated by the addition of sodium chloride, and the salt cake thus obtained may be further purified by solubilizing in water and precipitating the insulin at its iso-electric point. The recovered precipitated insulin may be solubilized and then crystallized after the addition thereto of zinc acetate or zinc chloride, to thereby obtain the zinc insulin salt.

Instead of the conventional purification method just described, it will be understood that other well-known purification methods leading to the preparation of finished amorphous or crystalline insulin compositions may be used.

We prefer to remove lipoidal material in the filtrate after the above filtration step in which the insoluble salt and inert protein is removed and prior to the purification of the filtrate to obtain insulin. After the filtration step, the filtrate obtained is adjusted by the addition of sulphuric acid (or some other acid) to a pH of 3–3.5 and concentrated under reduced pressure to an alcohol content of 15–25%, preferably about 20%. The lipoidal material, which then separates, may be removed by filtration or centrifugation, and the filtrate concentrated again under reduced pressure to the aqueous phase. There is a further precipitation of lipoidal material, and this is then removed by filtration or centrifugation.

The lipoidal material is preferably separated by partial removal of the alcohol under vacuum in a still. The temperature in this step is preferably kept as low as possible, while the still is maintained under reduced pressure. We have obtained good results by maintaining temperatures of 60°–70° F.

In the removal of lipoidal materials, we have found that an exceptionally sharp and quick separation can be carried out by heating the 15–25% concentrate to a temperature of about 85 to 110° F. before attempting to separate the lipoidal material. Although the concentration of the alcohol content to 15 to 25% itself tends to render the lipoids insoluble, the actual separation step at this point is ordinarily a slow and tedious one, requiring a lengthy filtration, or combination of filtration and centrifugation operations. Especially when large volumes of materials are being processed, the necessity of holding the extracts during extended separation steps is costly and tends to bring about a reduction in yield. However, we have found that the operation at this point may be greatly facilitated by taking the 15 to 25% concentrate, which is maintained at a temperature of about 60 to 70° F. during the concentration step, and heating it to about 85 to 110° F. This causes a very rapid flocculation of dispersed fat which rapidly rises and floats on the surface of the extracts, from which it can readily be removed and discarded. If the resulting extract remains slightly turbid, we have found further that the turbidity can quickly be removed to provide a sparkling clear solution by chilling to a temperature of about 55 to 70° F. and filtering. By the above improved procedure we have found it usually unnecessary to filter after complete concentration to the aqueous phase, since the lipoidal material is essentially completely removed in the previous step.

In the precipitation of inert proteins, it is advantageous to adjust the pH into the range of 5.2 to about 9.5, with the preferred range being 5.5–8.5. Our best results have been obtained in the range of pH 8–8.5. The inert protein material is effectively precipitated, and the removal of this material, together with the insoluble salts of phosphoric acid, has a highly beneficial effect upon the subsequent operations.

The solvent for the insulin may be any water-miscible organic solvent for insulin, such as ethyl alcohol, methyl alcohol, propyl alcohol, isopropyl alcohol, acetone, etc., or mixtures thereof. We prefer to use an aliphatic alcohol of less than 4 carbon atoms, and find ethyl alcohol the most desirable.

The concentration of the organic solvent in the extraction mixture should be sufficiently high to avoid substantial solubility of other substances, such as the pancreatic enzymes, and should not be so high as to produce substantial insolubilization of insulin. We find that an alcohol concentration of 50 to 85% by volume in the liquid present in the extraction mixture is satisfactory. Concentrations below 50% permit solubility of an undesirable amount of enzymes together with protein impurities, and concentrations above 85% produce a decreased yield of insulin. We prefer 60% to 75% alcohol concentration.

When we refer to "concentration" in this specification and claims, we mean the over-all concentration in the extraction mixture on the basis of the total volume of liquid present and not the concentration of the solvent added to the process.

The temperature at which the extraction is conducted may vary throughout a wide range, but we prefer to conduct the extraction step at temperatures between 0° and 15° C., and most suitably at about 10° C.

As above stated, in the recovery of insulin from pancreas glands, the hashed or macerated pancreatic tissue is extracted ordinarily in an acidified alcoholic solution containing 60% to 75% alcohol. The alcoholic extraction mixture ordinarily is acidified to a pH of about 2.0 with hydrochloric acid or sulphuric acid. Other workers more recently have reported using weak organic acids, such as acetic, formic, propionic and butyric acids, for this purpose.

We have shown that phosphoric acid is particularly suitable as an acidifying agent in the extraction of insulin from pancreatic tissue and that very considerably higher yields of insulin are obtained thereby than are obtained by the use of strong acids, such as hydrochloric or sulphuric acids. In the use of phosphoric acid for this purpose, we have found that maximal insulin recovery is obtained when the extraction mixture is acidified to a pH of from 2.5 to 4.0. We prefer to employ a pH of from 2.5 to 3.5 and find the range of 2.85 to 3.5 particularly satisfactory. We do not find it advantageous to reduce the pH below 2.5 since the yield of insulin is not appreciably increased by the use of more acid. Above pH 4.0 the yield drops off sharply.

We believe that the higher yields of insulin obtained with the use of phosphoric acid to be due to a combination of desirable properties possessed by this acid, which makes it particularly suited for use in the extraction of insulin from pancreatic tissue. This combination of desirable properties consists of the property of phosphoric acid of promoting maximum solubilization and extraction of insulin from pancreatic tissue without the necessity of using the excessively high acidity (pH 2.0) required when using hydrochloric or sulphuric acid, and, secondly, the property that the salts of phosphoric acid are relatively insoluble in the extraction solvent, so that the high salt concentration incurred in the extracts using hydrochloric, acetic or formic acid or other acids of this type, is avoided.

In the use of acetic, formic or hydrochloric acids in the extraction of insulin, it is necessary, after removing the gross pancreatic tissue after extraction, to neutralize the acidity in order to clarify the extracts by filtration. This is usually performed by adjusting the pH of the extracts to pH 7–8.5 by the addition of aqueous ammonia. This alkalinization also causes the precipitation and allows the removal of undesirable protein impurities which are precipitated in this pH range.

In the use of hydrochloric, acetic or formic acids, the adjustment of the pH of the extracts to 7.0–8.5 previous to filtration results in the introduction of very large amounts of soluble ammonium salts into the extracts. This is undesirable and does not occur when phosphoric acid is employed to acidify the extraction mixture, since the ammonium salts of phosphoric acid are relatively insoluble in the aqueous-alcoholic insulin extractant and are removed when the extracts are filtered after the pH has been adjusted toward neutrality or to the alkaline side with aqueous ammonia. This avoidance of the introduction of large quantities of soluble ammonium salts into the extracts contributes to higher insulin recovery, since the presence of such large amounts of salts raises the boiling point of the extracts during the later concentration in the still to remove alcohol and in this way and otherwise is responsible for large losses of insulin.

The use of phosphoric acid also allows the removal of other undesirable substances from the extracts, such as iron, copper, or heavier metals whose salts may be present in small amounts as salts of the metals which may have been introduced as contaminations in the reagents or materials or from the equipment employed in processing. It is known that the presence of such metallic ions causes insulin losses. The salts of such metals with phosphoric acid are comparatively insoluble in the extractant employed and are removed when the extracts are neutralized with ammonia and filtered. Such metallic ions are not so completely removed when sulphuric, hydrochloric, formic or acetic acids are used, since the salts of these acids are comparatively soluble in the extractant and adjustment of the extracts to the alkaline side does not serve to remove them as completely since the hydroxides of these metals are somewhat more soluble than their phosphate salts under the conditions.

We have found that when weak organic acids, such as acetic or formic are used, that it is necessary to use sufficient of these acids to lower the pH of the extraction mixture to about 3 to 3.5 in order to obtain optimal insulin extraction. These weak organic acids have acid dissociation constant of $1.8 \times 10^{-4}$ to $1.75 \times 10^{-5}$, and three to ten times the weight of such acids is required as compared to the quantity of phosphoric acid required to lower the extraction mixture proportionally. We consider the use of such weak acids impractical since it considerably increases the cost of processing due to the excessive quantities of acid required. Phosphoric acid is comparatively a stronger acid, having an acid dissociation constant of $1.1 \times 10^{-2}$, and we find this strength of acid particularly suitable for our purposes, and we do not find that acids with a dissociation constant of less than $1 \times 10^{-3}$ are suitable from a practical standpoint for insulin extraction.

In adjusting the pH of the centrifuged extracts upward in order to precipitate and remove undesirable proteins and insoluble salts of phosphoric acid, we prefer to use a relatively weak base as an alkalinizing agent in order to avoid local spots of unduly high alkalinity such as may occur using a strong base. We find that aqueous ammonia (ammonium hydroxide) is suitable and we prefer its use. However, various weak or strong bases can be used although it is necessary in order to avoid the introduction of large quantities of soluble salts into the extracts, to use a base which forms relatively insoluble salts with phosphoric acid in the given environment when the pH is adjusted to pH 5.5 to 9.5. In the case of ammonia or sodium hydroxide the precipitation of insoluble ammonium or sodium phosphate starts at about pH 5, the precipitation being more complete with increasing alkalinity. In the case of phosphoric acid the precipitation of ammonium phosphate is about two-thirds complete at pH 6 and about 90% complete at pH 8.0.

Therefore, the precipitation of insoluble salts and of undesirable proteins can be conducted between pH 6.0 and pH 9.5. We, however, prefer to adjust the extracts to between pH 7.5 and 8.5 before filtration since a higher alkalinity is not advantageous and a minimum amount of the salts of phosphoric acid remains soluble in this range.

In our preferred process, sufficient of the liquid phosphoric acid is added to an aqueous-alcoholic solution of between 65% and 95% alcohol content, so that after addition of the macerated pancreatic tissue, the pH of the extraction mixture is about 3.0 and the alcohol content about 60% to 65% after equilibrium is attained. After stirring and allowing sufficient time for extraction, the meat solids are removed by centrifugation and reextracted in 60% to 65% alcohol with the addition of sufficient acid to maintain the same pH and again centrifuged. The pH of the centrifuged extracts is adjusted to pH 6.0 to 9.5 with the addition of aqueous ammonia and filtered through a filter press to remove precipitated insoluble salts and proteins and other suspended material. The clear filtered extracts are reacidified to a pH of about 3.5 with sulphuric acid and further processed and concentrated and purified according to conventional and well-known procedures.

In acidifying the alcoholic extraction mixture, we do not find it advantageous to reduce the pH of the extraction mixture below pH 2.5 since we obtain optimal insulin yields in the range of pH 2.85 to 3.5 and do not appreciably increase the yield by the use of more acid. The amount of insulin extracted drops off sharply at a pH above 4.0. The desired range is pH 2.5 to 4.0 and our preferred range is pH 2.85 to 3.5.

Specific examples illustrating our improved process may be set out as follows:

*Example I*

40 pounds of frozen beef pancreas glands were hashed and extracted by stirring with 45,500 cc. of 85% alcohol containing 925 cc. of phosphoric acid. The acidity of the extraction mixture was pH 3.0 and the alcohol concentration approximately 65% after equilibrium was attained. The pancreatic meat solids removed were then reextracted by stirring in 45,000 cc. of 65% alcohol. The pH of the combined filtrates was raised to pH 8.0 by addition of ammonium hydroxide to precipitate inert proteins and phosphoric acid salts. The solids were removed by filtration and sulphuric acid was then added to the filtrate to bring the pH to 3.5. The acidified extracts were then concentrated under reduced pressure to an alcohol concentration of 20%. Lipoidal material was removed by filtration and the filtrate concentrated under reduced pressure to the aqueous phase. Lipoidal material was then removed by filtration and the insulin-containing filtrate biologically assayed for insulin activity. The biological assay showed the insulin recovered to be equivalent to 1425 International Units for each pound of pancreas glands processed.

*Example II*

40 pounds of frozen pork pancreas glands were hashed and extracted by stirring with 45,500 cc. of 85% alcohol containing 925 cc. of phosphoric acid. The acidity of the extraction mixture was pH 3.0 and the alcohol concentration approximately 65% after equilibrium was attained. The pancreatic meat solids removed were then reextracted by stirring in 45,000 cc. of 65% alcohol. The pH of the combined filtrates was raised to pH 8.5 by the addition of ammonia to precipitate the phosphoric acid salts and inert proteins. The solids were removed by filtration and sulphuric acid was then added to the filtrate to bring the pH to 3.5. The acidified extracts were then concentrated under reduced pressure to an alcohol concentration of 20%. Lipoidal material was then removed by filtration and the insulin-containing filtrate biologically assayed for insulin activity. The biological assay showed the insulin recovered to be equivalent to 1615 International Units for each pound of pancreas glands processed.

*Example III*

1,500 pounds of frozen beef pancreas glands were hashed and extracted by the use of phosphoric acid in the extraction step as described in Example I. The mixture was acidified to pH 3.5 with phosphoric acid. After extraction, the suspended solids were removed by filtration in a filter press. The insulin-containing filtrate was then adjusted to pH 8 by the addition of aqueous ammonia, and the precipitated ammonium salts of phosphoric acid and inert proteins were removed by filtration through a filter press. The filtrate was then acidified to pH 3.5 with sulphuric acid. The mass of the lipoidal material was removed by distilling under reduced pressure to an alcohol content of approximately 20% followed by filtration and by further concentration under reduced pressure to the aqueous phase. The insulin in the filtrate was then recovered by the conventional procedure, using sodium chloride, etc. The yield of crystalline insulin amounted to 1400 International Units per pound of original glands used.

Similar quantities of frozen pork pancreas glands were hashed and extracted as above described in Example III and with similar results. The yield of the final insulin product in the crystalline or amorphous form represented a large increase over the yields obtained in processes employing the standard hydrochloric acid process.

*Example IV*

100 pounds of frozen beef pancreas glands were hashed into 118 liters of 82% alcohol containing 2200 cc. of phosphoric acid and extracted by stirring. The pH of the extraction mixture was 3.1 and the alcohol concentration 65% after equilibrium was attained. The meat solids were removed by centrifugation and reextracted in 100 liters of 65% alcohol. The combined centrifuged extracts were adjusted to pH 8.2 with aqueous ammonia and filtered. The filtered extracts were then reacidified to pH 3.5 with the addition of sulphuric acid and concentrated in vacuo and filtered to remove lipoids. Biological assay of the aqueous concentrate showed the insulin recovered to amount of 1876 units per pound of glands processed. The insulin in the aqueous concentrate was then salted out by the addition of sodium chloride and the insulin salt cake obtained solubilized in water, and the insulin precipitated at the iso-electric point. The insulin precipitate was then solubilized in water containing a buffer, and the insulin converted to zinc insulin crystals by the addition of zinc acetate. The yield of dried zinc insulin crystals recovered as determined by weight and biological assay was 1526 units per pound of pancreas glands.

*Example IV–A*

2000 pounds of exceptionally good frozen beef pancreas glands from the same lot processed in Example IV were hashed into 600 gallons of 93% alcohol containing 30,000 cc. of hydrochloric acid and extracted by stirring. The pH of the extraction mixture was 2.0 and the alcohol concentration 70%. The meat solids were removed by centrifugation and reextracted in 600 gallons of 70% alcohol. The combined centrifuged extracts were adjusted to pH 7.6 by the addition of aqueous ammonia and filtered. The filtered extracts were reacidified to pH 3.5 by the addition of sulphuric acid and concentrated in vacuo and filtered to remove lipoids. Biological assay indicated the insulin content of the aqueous concentrate to be 1000 units per pound of pancreas glands processed. The insulin was salted out from the aqueous concentrate and purified and crystallized by the same procedure employed in Example IV. The yield of dried zinc insulin crystals recovered as determined by weight and biological assay amounted to 835 units per pound of pancreas glands.

*Example V*

40 pounds of hashed frozen pork pancreas glands were extracted by stirring in 47 liters of 82% alcohol containing 800 cc. of phosphoric acid. The pH of the extraction mixture was 3.1 and the alcohol concentration 65% after equilibrium was attained. The meat residue was removed by centrifugation and then reextracted in 40 liters of 65% alcohol. The combined centrifugates were adjusted to pH 8.5 by the addition of aqueous ammonia and filtered. A sample of the alcoholic insulin containing filtrates was removed and biologically assayed. The insulin content of the filtrate amounted to 2090 units per pound of pancreas processed.

The filtered extracts were then concentrated in vacuo and filtered to remove lipoids. The insulin content of the aqueous filtered concentrate as shown by biological assay was 1760 units per pound pancreas glands processed.

The filtered extracts were then concentrated in vacuo and filtered to remove lipoids. The insulin content of the aqueous filtered concentrate as shown by biological assay was 1760 units per pound pancreas glands processed.

*Example V-A*

40 pounds of hashed frozen pork pancreas consisting of a representative sample of the same lot of glands processed in Example V were hashed into 47 liters of 82% alcohol containing 9.2 pounds of liquid formic acid. The pH of the extraction mixture was 3.2 and the alcohol concentration approximately 65%. The meat residue was removed by centrifugation and reextracted in 40 liters of 65% alcohol. The combined centrifuged extracts were then adjusted to pH 8.5 with aqueous ammonia and filtered.

A sample of the filtered alcoholic extracts removed and biologically assayed showed the insulin content of the extracts to be 1680 units per pound of glands processed.

The filtered extracts were then reacidified and concentrated and filtered by a procedure identical to that employed in Example V. The yield of insulin in the aqueous concentrate by biological assay was 870 units per pound.

Example IV and IV-A, and Example V and V-A demonstrate the injurious effect of the presence of large amounts of soluble ammonium salts of such acids as hydrochloric acid and of formic acid, whose ammonium salts are not precipitated and removed in the extraction solvent employed. As observed in Example V and V-A, the insulin loss during concentration and filtration of the extracts is much less when phosphoric acid, whose ammonium salts are insoluble and are removed, is employed.

*Example VI*

In a commercial scale operation, 7000 pounds of frozen beef pancreas glands were hashed and macerated and extracted by stirring in 1860 gallons of 82% alcohol containing 153 liters of phosphoric acid (USP). After equilibrium was attained by stirring, the pH was 2.85 and the alcohol concentration about 65%. The pancreatic tissue insolubles were removed by centrifugation and reextracted under the same conditions. After centrifugation, the combined extracting liquid was alkalinized to pH 8.2 by the addition of aqueous ammonia and filtered. The filtered extracts were reacidified to pH 3.0 by the addition of $H_2SO_4$. The reacidified extracts were then partially concentrated in the vacuum still to about 20% alcohol concentration, and the partially concentrated extracts were heated to 90° F. and allowed to stand 10 minutes. At the end of this time, a layer of fat had formed on the surface of the extracts. The lower insulin containing extracts were drawn off at the bottom of the still, and the upper fat layer discarded. The slightly turbid extracts were then chilled to 65° F. and filtered with the aid of diatomaceous earth filter aid to give a sparkling clear solution. The clarified solution was concentrated to the aqueous phase and at this stage was found to contain 1800 units of insulin per pound of glands processed.

The foregoing process for the extraction and recovery of insulin from pancreas glands may be varied through wide ranges, many of the steps employed being optional. We prefer to extract with the insulin solvent containing phosphoric acid and to follow this step with the addition of a base to form insoluble salts of the phosphoric acid. After the phosphoric acid has been removed from the process in the form of ammonium salts of phosphoric acid, it is found that the resulting extract may be treated much more effectively for the recovery of insulin therefrom.

While, in the foregoing specification, certain steps of the process have been described in considerable detail for the purpose of illustrating embodiments of the invention, it will be understood that such details may be varied widely by those skilled in the art without departing from the spirit of our invention.

We claim:

1. In a process for obtaining insulin from pancreas glands, the steps of forming an extraction mixture of insulin-bearing pancreas glandular solids and an aqueous organic solvent for insulin, said mixture being acidified to a pH from 2.5 to 4.0 with phosphoric acid and said organic solvent therein being at a concentration favoring the solubilization of insulin over pancreatic enzymes, extracting insulin from said glandular solids into said aqueous organic solvent to form an insulin extract, adding ammonia to the extract to adjust the pH thereof from 5.5 to 8.5 for precipitating ammonium salts of phosphoric acid, and separating the phosphoric salts thus precipitated.

2. In a process for obtaining insulin from pancreas glands, the steps of forming an extraction mixture of insulin-bearing pancreas glandular solids and an aqueous organic solvent for insulin, said mixture being acidified to a pH from 2.5 to 4.0 with phosphoric acid and said organic solvent therein being at a concentration favoring the solubilization of insulin over pancreatic enzymes, extracting insulin from said glandular solids into said aqueous organic solvent to form an insulin extract, separating the insulin extract from the glandular solids, adding ammonia to the extract to adjust the pH thereof from 5.5 to 8.5 for precipitating inert protein solids and ammonium salts of phosphoric acid, and separating from said extract the protein salts and phosphoric acid salts thus precipitated.

3. In a process for obtaining insulin from pancreas glands, the steps of forming an extraction mixture of insulin bearing pancreas glandular solids and aqueous ethyl alcohol, said mixture being acidified to a pH from 2.5 to 4.0 with phosphoric acid and the ethyl alcohol therein providing 50 to 85% of the liquid volume, extracting insulin from said glandular solids into said aqueous ethyl alcohol to form an insulin extract, adding ammonia to the extract to adjust the pH thereof from 5.5 to 8.5 for precipitating ammonium salts of phosphoric acid, and separating the phosphoric acid salts thus precipitated.

4. In a process for obtaining insulin from pancreas glands, the steps of forming an extraction mixture of insulin bearing pancreas glandular solids and aqueous ethyl alcohol, said mixture being acidified to a pH from 2.5 to 4.0 with phosphoric acid and the ethyl alcohol therein providing 50 to 85% of the liquid volume, extracting insulin from said glandular solids into said aqueous ethyl alcohol to form an insulin extract, separating the insulin extract from the glandular solids, adding ammonia to the extract to adjust the pH thereof from 5.5 to 8.5 for precipitating inert protein solids and ammonium salts of phosphoric acid, and separating from said extract the protein solids and phosphoric acid salts thus precipitated.

References Cited in the file of this patent

UNITED STATES PATENTS

| Number | Name | Date |
|---|---|---|
| 1,669,328 | Dudley | May 8, 1928 |
| 1,866,569 | Kharasch | July 12, 1932 |
| 2,353,016 | Daughenbaugh | July 4, 1944 |
| 2,466,487 | Scott et al. | Apr. 5, 1949 |
| 2,529,152 | Grant | Nov. 7, 1950 |
| 2,571,126 | Frederiksen | Oct. 16, 1951 |
| 2,595,278 | Maxwell et al. | May 6, 1952 |

OTHER REFERENCES

Somogyi, J. Biol. Chem., vol. 60, 1924, pp. 34 to 47 and 54 to 57.